United States Patent
Jose et al.

(10) Patent No.: US 10,659,381 B2
(45) Date of Patent: May 19, 2020

(54) METHOD AND APPARATUS FOR HANDLING DATA DUPLICATION IN MOBILE COMMUNICATIONS

(71) Applicant: MediaTek Singapore Pte. Ltd., Singapore (SG)

(72) Inventors: Pradeep Jose, Cambridge (GB); Mehmet Kunt, Cambridge (GB); Pavan Santhana Krishna Nuggehalli, San Jose, CA (US)

(73) Assignee: MEDIATEK SINGAPORE PTE. LTD., Singapore (SG)

( * ) Notice: Subject to any disclaimer, the term of this patent is extended or adjusted under 35 U.S.C. 154(b) by 0 days.

(21) Appl. No.: 16/009,425

(22) Filed: Jun. 15, 2018

(65) Prior Publication Data
US 2018/0367463 A1 Dec. 20, 2018

Related U.S. Application Data

(60) Provisional application No. 62/520,607, filed on Jun. 16, 2017.

(51) Int. Cl.
*H04L 12/823* (2013.01)
*H04W 76/15* (2018.01)
*H04L 1/18* (2006.01)
*H04L 12/709* (2013.01)

(52) U.S. Cl.
CPC .............. *H04L 47/32* (2013.01); *H04L 1/189* (2013.01); *H04L 1/1812* (2013.01); *H04W 76/15* (2018.02); *H04L 45/245* (2013.01)

(58) Field of Classification Search
CPC ....... H04L 47/32; H04L 1/1812; H04W 76/15
See application file for complete search history.

(56) References Cited

U.S. PATENT DOCUMENTS

| 2013/0266001 | A1 | 10/2013 | Peisa et al. |
| 2013/0279490 | A1 | 10/2013 | Pani et al. |
| 2015/0305034 | A1* | 10/2015 | Balachandran ....... H04W 76/00 370/315 |

(Continued)

FOREIGN PATENT DOCUMENTS

WO    WO 2017014802 A1    1/2017

OTHER PUBLICATIONS

United States Patent and Trademark Office, International Search Report and Written Opinion for International Patent Application No. PCT/US2018/037700, dated Sep. 4, 2018.

(Continued)

*Primary Examiner* — Charles C Jiang
*Assistant Examiner* — Voster Preval
(74) *Attorney, Agent, or Firm* — Han IP PLLC; Andy M. Han

(57) ABSTRACT

Various solutions for handling data duplication with respect to user equipment and network apparatus in mobile communications are described. An apparatus may establish a first link and a second link with a network. The apparatus may generate a first protocol data unit (PDU) to transmit on the first link. The apparatus may generate a second PDU to transmit on the second link. The apparatus may transmit the first PDU on the first link. The apparatus may determine whether to discard the second PDU according to a condition. The second PDU may be duplicated from the first PDU.

19 Claims, 6 Drawing Sheets

(56) References Cited

U.S. PATENT DOCUMENTS

| | | | | |
|---|---|---|---|---|
| 2016/0007228 | A1* | 1/2016 | Soriaga | H04W 28/0257 |
| | | | | 370/216 |
| 2016/0164793 | A1* | 6/2016 | Basu Mallick | H04L 47/32 |
| | | | | 370/235 |
| 2016/0183158 | A1* | 6/2016 | Decarreau | H04W 36/02 |
| | | | | 370/328 |
| 2016/0302075 | A1* | 10/2016 | Dudda | H04W 12/10 |
| 2018/0035483 | A1* | 2/2018 | Nagasaka | H04W 72/0406 |
| 2018/0098250 | A1* | 4/2018 | Vrzic | H04W 36/0016 |
| 2018/0227219 | A1* | 8/2018 | Zhang | H04W 28/0273 |
| 2018/0279173 | A1* | 9/2018 | Loehr | H04L 61/6022 |
| 2018/0309660 | A1* | 10/2018 | Loehr | H04W 36/0066 |
| 2018/0324642 | A1* | 11/2018 | Yu | H04L 1/1835 |
| 2019/0098640 | A1* | 3/2019 | Holakouei | H04L 1/1825 |

OTHER PUBLICATIONS

Taiwan Intellectual Property Office, Office Action for Taiwan Patent Application No. 107120766, dated Aug. 8, 2019.

* cited by examiner

METHOD AND APPARATUS FOR HANDLING DATA DUPLICATION IN MOBILE COMMUNICATIONS

CROSS REFERENCE TO RELATED PATENT APPLICATION(S)

The present disclosure is part of a non-provisional application claiming the priority benefit of U.S. Patent Application No. 62/520,607, filed on 16 Jun. 2017, the content of which is incorporated by reference in its entirety.

TECHNICAL FIELD

The present disclosure is generally related to mobile communications and, more particularly, to data duplication handling with respect to user equipment and network apparatus in mobile communications.

BACKGROUND

Unless otherwise indicated herein, approaches described in this section are not prior art to the claims listed below and are not admitted as prior art by inclusion in this section.

In Long-Term Evolution (LTE), New Radio (NR) or a newly developed wireless communication system, support for the transmissions of data with high reliability and low latency criterion has been introduced. A mechanism to aid the transmission of such data is the duplication of data transmissions over multiple links. To transmit multiple copies of the same data over the multiple links may improve the reliability of data reception. However, such mechanism may be accompanied by the cost of increased resource usage such as spectrum utilization, transmission power and so on.

Accordingly, both transmission reliability and resource efficiency may be important considerations for uplink data transmission. In order to avoid wasting resources, a proper design for handling data duplication is needed.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to propose solutions or schemes that address the aforementioned issues pertaining to data duplication handling with respect to user equipment and network apparatus in mobile communications.

In one aspect, a method may involve an apparatus establishing a first link and a second link with a network. The method may also involve the apparatus generating a first protocol data unit (PDU) to transmit on the first link. The method may further involve the apparatus generating a second PDU to transmit on the second link. The method may further involve the apparatus transmitting the first PDU on the first link. The method may further involve the apparatus determining whether to discard the second PDU according to a condition. The second PDU may be duplicated from the first PDU.

In one aspect, a method may involve an apparatus establishing a first link and a second link with a network. The method may also involve the apparatus generating a first protocol data unit (PDU) to transmit on the first link. The method may further involve the apparatus transmitting the first PDU on the first link. The method may further involve the apparatus determining that the first PDU is unacknowledged. The method may further involve the apparatus re-transmitting the first PDU on the first link. The method may further involve the apparatus generating a second PDU by duplicating the first PDU. The method may further involve the apparatus transmitting the second PDU on the second link.

In one aspect, an apparatus may comprise a transceiver capable of wirelessly communicating with a plurality of nodes of a wireless network. The apparatus may also comprise a processor communicatively coupled to the transceiver. The processor may be capable of establishing a first link and a second link with a network. The processor may also be capable of generating a first PDU to transmit on the first link. The processor may further be capable of generating a second PDU to transmit on the second link. The processor may further be capable of transmitting the first PDU on the first link. The processor may further be capable of determining whether to discard the second PDU according to a condition. The second PDU may be duplicated from the first PDU.

In one aspect, an apparatus may comprise a transceiver capable of wirelessly communicating with a plurality of nodes of a wireless network. The apparatus may also comprise a processor communicatively coupled to the transceiver. The processor may be capable of establishing a first link and a second link with a network. The processor may also be capable of generating a first PDU to transmit on the first link. The processor may further be capable of transmitting the first PDU on the first link. The processor may further be capable of determining that the first PDU is unacknowledged. The processor may further be capable of re-transmitting the first PDU on the first link. The processor may further be capable of generating a second PDU by duplicating the first PDU. The processor may further be capable of transmitting the second PDU on the second link.

It is noteworthy that, although description provided herein may be in the context of certain radio access technologies, networks and network topologies such as Long-Term Evolution (LTE), LTE-Advanced, LTE-Advanced Pro, 5th Generation (5G), New Radio (NR), Internet-of-Things (IoT) and Narrow Band Internet of Things (NB-IoT), the proposed concepts, schemes and any variation(s)/derivative(s) thereof may be implemented in, for and by other types of radio access technologies, networks and network topologies. Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

DETAILED DESCRIPTION OF PREFERRED IMPLEMENTATIONS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to data duplication handling with respect to user equipment and network apparatus in mobile communications. According to the present disclosure, a number of possible solutions may be implemented separately or jointly. That is, although these possible solutions may be described below separately, two or more of these possible solutions may be implemented in one combination or another.

Figure 1:
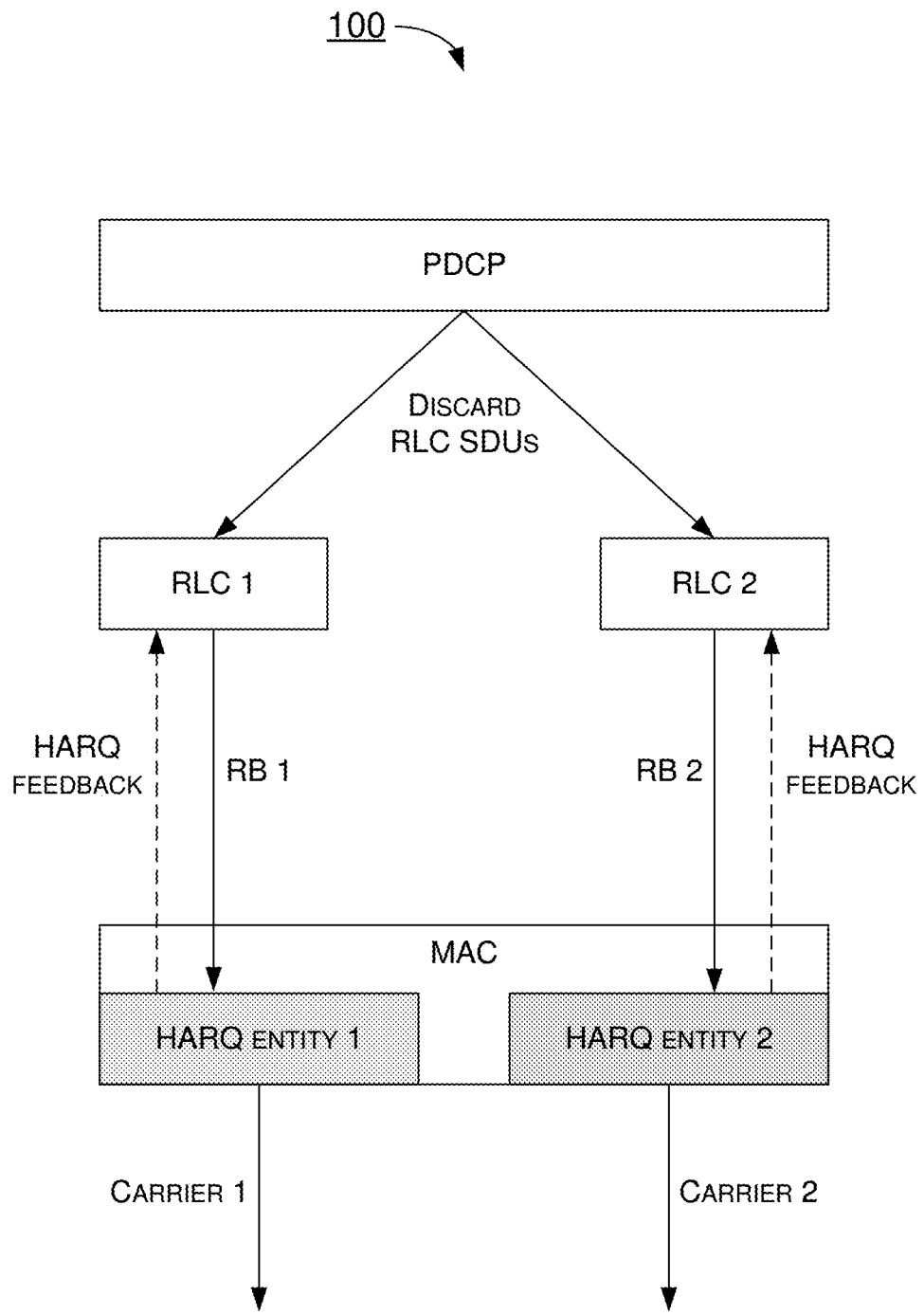
FIG. 1 is a diagram depicting an example scenario under schemes in accordance with implementations of the present disclosure.

FIG. 1 illustrates an example scenario 100 under schemes in accordance with implementations of the present disclosure. Scenario 100 involves a UE and a plurality of nodes, which may be a part of a wireless communication network (e.g., an LTE network, an LTE-Advanced network, an LTE-Advanced Pro network, a 5G network, an NR network, an IoT network or an NB-IoT network). The UE may comprise a plurality of protocol layers including a packet data convergence protocol (PDCP) layer, a radio link control (RLC) layer and a medium access control (MAC) layer. In order to support transmission of data with high reliability and low latency criterions, a mechanism to aid the transmission of such data is to duplicate data transmissions over multiple links. Transmitting multiple copies of the same data may improve the probability of data reception. Accordingly, the UE may be configured to establish multiple links with the wireless communication network. FIG. 1 illustrates an example scenario of carrier aggregation. The UE may be configured to establish a first link (e.g., carrier 1) with the network. The UE may also be configured to establish a second link (e.g., carrier 2) with the network. The first link and the second link may be connected to the same network node or different network nodes.

The PDCP layer may comprise a PDCP entity. The RLC layer may comprise a first RLC entity (e.g., RLC 1) and a second RLC entity (e.g., RLC 2). The PDCP entity may be configured to generate and duplicate the data packets (e.g., PDUs), and deliver to multiple RLC entities. The first RLC entity may be configured to receive a first PDU (e.g., PDCP PDU) from the PDCP entity. The second RLC entity may be configured to receive a second PDU (e.g., PDCP PDU) from the PDCP entity. The second PDU may be duplicated from the first PDU. The first RLC entity may be configured with a first radio bearer (e.g., RB 1). The second RLC entity may be configured with a second radio bearer (e.g., RB 2). The RLC entities may further deliver the data packets (e.g., PDUs) to the MAC layer. The MAC layer may be configured to map the duplicated data packets (e.g., PDUs) to different carriers. The UE may be configured to transmit the first PDU on the first link (e.g., carrier 1), and transmit the second PDU on the second link (e.g., carrier 2).

However, in some scenarios, asymmetric transmissions may occur over the multiple links. The multiple links may have different data rates due to various reasons such as, for example and without limitation, poor channel conditions, congestion at the network node or differences in spectra/ channels used. For example, the first link may be a fast link, and the second link may be a slow link. In such case, the transmission of data over the slow link may be delayed and may lead to backlog of data in its buffers. As the delay increases, the likelihood of successful transmission of the same data over the fast link may increase. The eventual transmission of the data present in the backlog that has already been successfully transmitted over the fast link provides no benefit and may be a waste of transmission resources. In addition, the unnecessary transmission of such data in the backlog may pre-empt the transmission of newly arrived data that could benefit from the reliability advantage that duplication transmission provides. Such pre-emption delay may not be acceptable for the stringent low-latency requirements such as ultra-reliable and low latency communications (URLLC). Accordingly, it is important to deal with asymmetric transmissions and handle data duplication. The UE may be further configured to determine whether to discard the duplicated data packet according to some conditions.

To overcome the problems described above, data duplication in PDCP may be configured with lower layer interactions. As shown in FIG. 1, the MAC layer may further comprise a first hybrid automatic repeat request (HARQ) entity (e.g., HARQ entity 1) for the first link and a second HARQ entity (e.g., HARQ entity 2) for the second link. The HARQ feedback may be used by the receiving side to indicate whether the data packet is successfully received at the receiving side. Specifically, after transmitting the first PDU on the first link, the first HARQ entity may be able to receive a HARQ feedback of the first PDU from the receiving side. The HARQ feedback may indicate whether the first PDU transmitted over the first link is successfully received. In a case that a HARQ acknowledgement (HARQ ACK) is received, the MAC layer may be configured to deliver the HARQ ACK to the upper layer (e.g., RLC layer). The RLC (e.g., RLC 1) entity may be configured to relay the HARQ ACK to the PDCP entity. Alternatively, the MAC layer may be configured to deliver the HARQ ACK to the PDCP layer directly. When the successful delivery of the PDU (e.g., PDCP data PDU) is confirmed by one of the two associated RLC entities (e.g., RLC 1) or one of the two associated MAC entities, the PDCP entity may be triggered to use the SDU discard mechanism to discard the duplicated PDU. For example, the PDCP entity may indicate to the other RLC entity (e.g., RLC 2) to discard the duplicated data packet (e.g., PDCP PDU or RLC SDU). Accordingly, the duplicated data packet may not be deliver to lower layer for transmission. The waste of the resources may be avoided.

In some implementations, when the PDCP entity is configured with PDCP duplication, the PDCP entity should be configured to activate the PDCP duplication for the signaling radio bearer (SRB). For the unacknowledged mode (UM) data radio bearer (DRB) and the acknowledged mode (AM) DRB, the PDCP entity should be configured to activate the PDCP duplication in a case that the activation of the PDCP duplication is indicated. The PDCP entity should also be configured to deactivate the PDCP duplication in a case that the deactivation of the PDCP duplication is indicated.

In some implementations, when the deactivation of the PDCP duplication is indicated, the transmitting PDCP entity may be configured to indicate to the RLC entity to discard all the duplicated data packet.

Figure 2:
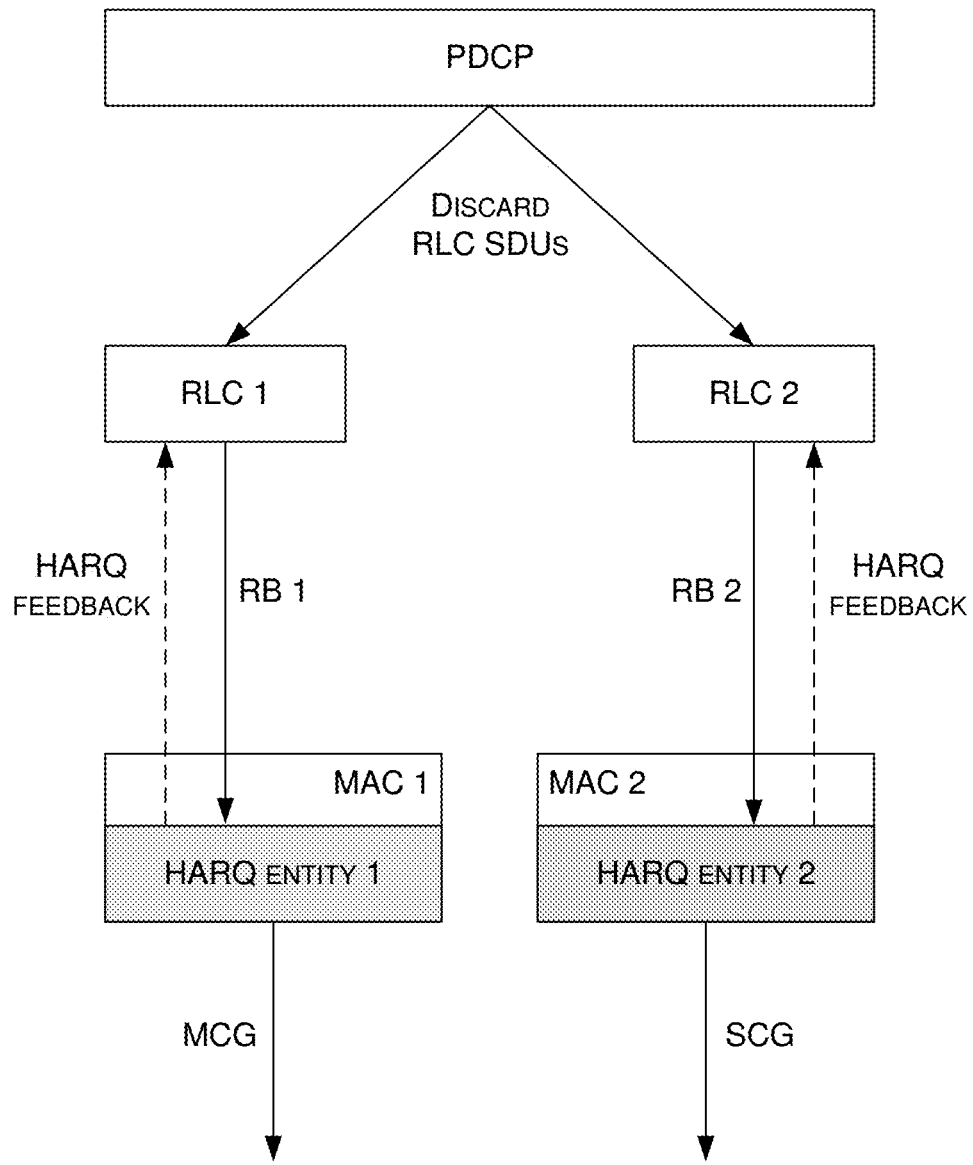
FIG. 2 is a diagram depicting an example scenario under schemes in accordance with implementations of the present disclosure.

FIG. 2 illustrates an example scenario 200 of dual connectivity (DC) under schemes in accordance with implementations of the present disclosure. In DC scenario, the MAC layer may comprise a first MAC entity (e.g., MAC 1) and a second MAC entity (e.g., MAC 2). The first MAC entity may comprise a first HARQ entity (e.g., HARQ entity 1). The second MAC entity may comprise a second HARQ entity (e.g., HARQ entity 2). The UE may be configured to establish a first link with the master cell group (MCG). The UE may also be configured to establish a second link with the secondary cell group (SCG). The PDCP duplication operations and the discard mechanism may be similar to the carrier aggregation scenario.

Figure 3:
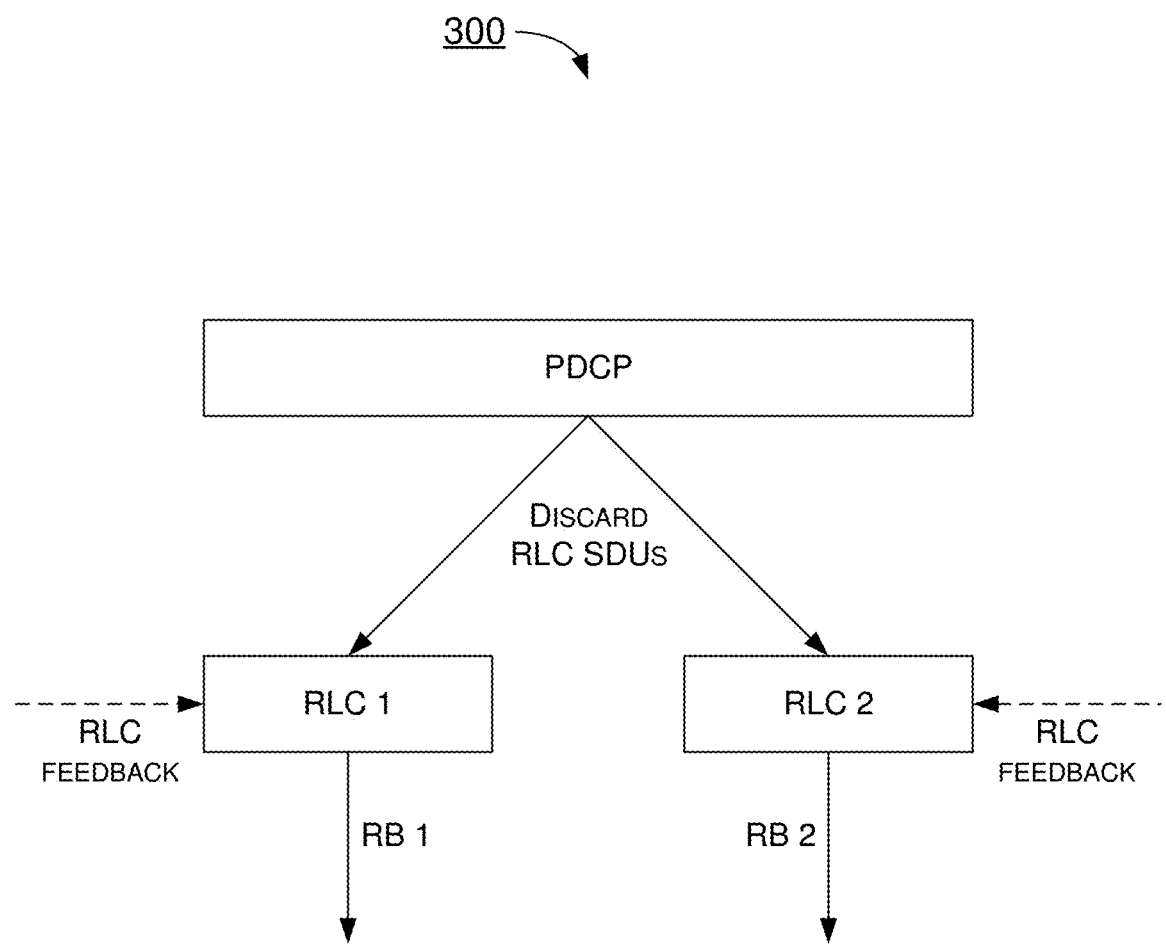
FIG. 3 is a diagram depicting an example scenario under schemes in accordance with implementations of the present disclosure.

FIG. 3 illustrates an example scenario 300 under schemes in accordance with implementations of the present disclosure. The protocol stack of FIG. 3 may be similar to the protocol stack of FIG. 1. In scenario 300, the feedback from the receiving side may be received at the RLC layer. Specifically, after transmitting the first PDU on the first link, the first RLC entity (e.g., RLC 1) may be able to receive an RLC feedback of the first PDU from the receiving side. The RLC feedback may indicate whether the first PDU transmitted over the first link is successfully received. In a case that an acknowledgement (ACK) is received, the RLC layer may be configured to deliver the ACK to the upper layer (e.g., PDCP layer). When the successful delivery of the PDU (e.g., PDCP data PDU) is confirmed by one of the two associated RLC entities (e.g., RLC 1), the PDCP entity may be triggered to use the SDU discard mechanism to discard the duplicated PDU. For example, the PDCP entity may indicate to the other RLC entity (e.g., RLC 2) to discard the duplicated data packet (e.g., PDCP PDU or RLC SDU). Accordingly, the duplicated data packet may not be delivered to the lower layer for transmission. The waste of the resources may be avoided.

Figure 4:
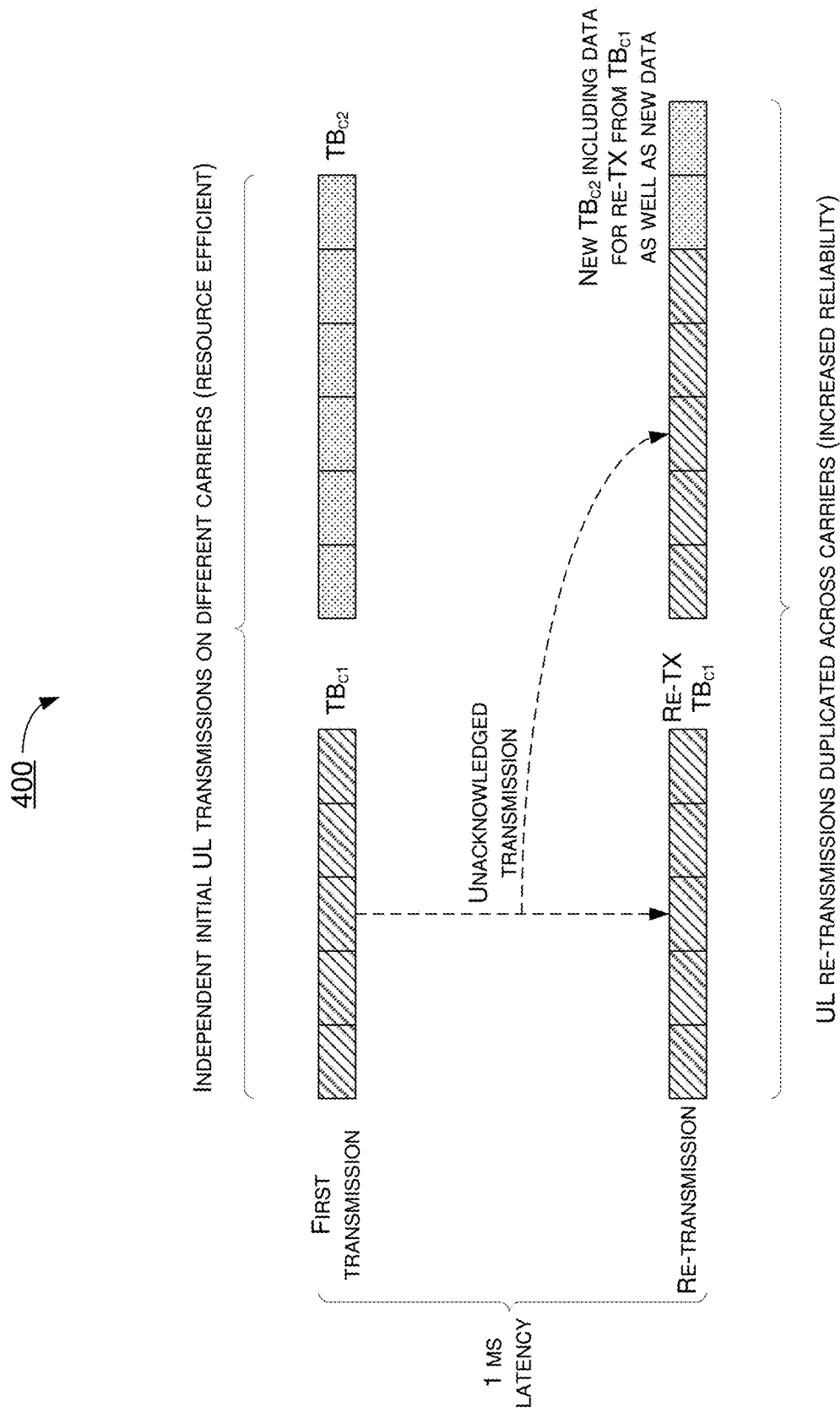
FIG. 4 is a diagram depicting an example scenario under schemes in accordance with implementations of the present disclosure.

FIG. 4 illustrates an example scenario 400 under schemes in accordance with implementations of the present disclosure. Scenario 400 involves a UE and a plurality of nodes, which may be a part of a wireless communication network (e.g., an LTE network, an LTE-Advanced network, an LTE-Advanced Pro network, a 5G network, an NR network, an IoT network or an NB-IoT network). The UE may be configured to establish a first link (e.g., carrier 1) with the network. The UE may also be configured to establish a second link (e.g., carrier 2) with the network. The first link and the second link may be connected to the same network node or different network nodes.

In the initial transmission, the UE may be configured to transmit a single copy or a reduced number of copies of the data to the receiving side. For example, the UE may be configured to transmit a first data packet (e.g., PDU or transport block (TB)) on the first link (e.g., carrier 1). For resource efficiency, the UE may be configured to transmit another data packet which is different from the first data packet on the second link (e.g., carrier 2). The transmission on the second link may be independent from the transmission on the first link. In a case that the first data packet is not successfully acknowledged by the receiving side, the UE may be configured to perform re-transmission with an increased number of copies of the data packet on multiple links. The data that is not acknowledged on the initial transmission may be duplicated. For example, the UE may determine that the first data packet is unacknowledged in a case that a negative acknowledgement (NACK) is received or no ACK is received. The UE may be configured to re-transmit the first data packet on the first link. The UE may be further configured to generate a second data packet by duplicating the unacknowledged data (e.g., first data packet). The UE may be configured to transmit the second data packet on the second link when performing the re-transmission. In addition to the duplicated data from the first data packet, the second data packet may further comprise new data if possible. Accordingly, the uplink transmission may be duplicated across carriers to increase reliability when performing re-transmission.

In some implementations, the UE may be configured to initiate a timer (e.g., discardTimer) when the data arrives at the PDCP layer. The duration of the timer may be determined based on the low-latency criterion of the data to be transmitted. The data may be duplicated for transmission on the multiple links. The UE may be configured to discard all copies of the data that are not yet transmitted (e.g., second PDU) when the timer is expired. The timer may be maintained in the PDCP layer or in other layers. The timer may also be initiated when the data arrives any other layers. The duration of the timer may be configured by the network side or determined by the UE itself. Accordingly, the duplicated data may not be pended for long time. The buffer spaces may be released, and new transmission may be performed by discarding the duplicated data.

In some implementations, the UE may be configured to maintain a sliding window to discard the data. The sliding window may be maintained in the PDCP layer or any other layers (e.g., RLC or MAC layer). The length of the sliding window may be determined based on the expected rate of data arrival or the low-latency criterion of the data to be transmitted. The length of the sliding window may be configured by the network side or determined by the UE itself. The sliding window may be configured to advance as the data arrives at the layer in which the sliding window is maintained. For example, the sliding window may advance when a new PDU is generated. The UE may be configured to discard the data (e.g., PDU) when the data falls out of the sliding window. Accordingly, the old data may be discarded when the new data arrives.

In some implementations, the sliding window may be configured to advance as the data (e.g., PDU) is transmitted on any of the multiple links. The sliding window may be maintained in the lower layer (e.g., MAC layer). The UE may be configured to discard the data when the data falls out of the sliding window.

In some implementations, after the data (e.g., first PDU) is transmitted on any link, the UE may be configured to discard all duplicated data that have not been transmitted (e.g., second PDU). Such design may be considered as a special case when the length of the sliding window is set to zero.

In some implementations, the UE may be configured to initiate a timer (e.g., discardTimer) for all the duplicated data (e.g., second PDU) after the data has been transmitted on a link (e.g., first PDU). The duration of the timer may be determined based on the low-latency criterion of the data to be transmitted. The UE may be configured to discard all the duplicated data that is not yet transmitted (e.g., second PDU) when the timer is expired. The timer may be maintained in the RLC layer (e.g., RLC timer) or in other layers (e.g., PDCP or MAC timer). The duration of the timer may be configured by the network side or determined by the UE itself. Accordingly, the duplicated data may not be pended for long time. The buffer spaces may be released, and new transmission may be performed by discarding the duplicated data.

In some implementations, a timer (e.g., discardTimer) may be used only when the PDCP duplication is configured or activated.

Illustrative Implementations

Figure 5:
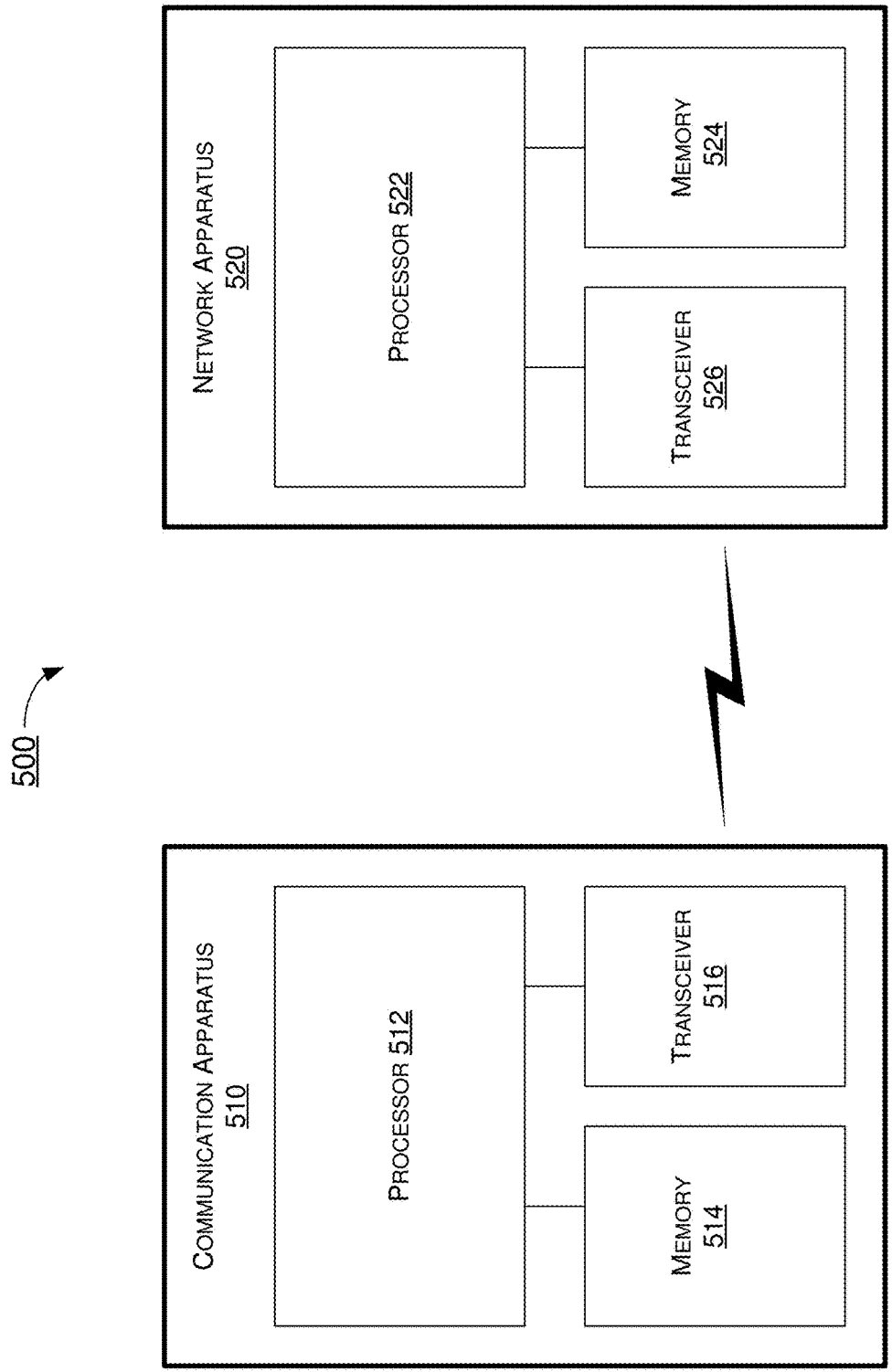
FIG. 5 is a block diagram of an example communication apparatus and an example network apparatus in accordance with an implementation of the present disclosure.

FIG. 5 illustrates an example communication apparatus 510 and an example network apparatus 520 in accordance with an implementation of the present disclosure. Each of communication apparatus 510 and network apparatus 520 may perform various functions to implement schemes, techniques, processes and methods described herein pertaining to data duplication handling with respect to user equipment and network apparatus in wireless communications, including scenarios 100, 200, 300 and 400 described above as well as process 600 described below.

Communication apparatus 510 may be a part of an electronic apparatus, which may be a UE such as a portable or mobile apparatus, a wearable apparatus, a wireless communication apparatus or a computing apparatus. For instance, communication apparatus 510 may be implemented in a smartphone, a smartwatch, a personal digital assistant, a digital camera, or a computing equipment such as a tablet computer, a laptop computer or a notebook computer. Communication apparatus 510 may also be a part of a machine type apparatus, which may be an IoT or NB-IoT apparatus such as an immobile or a stationary apparatus, a home apparatus, a wire communication apparatus or a computing apparatus. For instance, communication apparatus 510 may be implemented in a smart thermostat, a smart fridge, a smart door lock, a wireless speaker or a home control center. Alternatively, communication apparatus 510 may be implemented in the form of one or more integrated-circuit (IC) chips such as, for example and without limitation, one or more single-core processors, one or more multi-core processors, one or more reduced-instruction-set-computing (RISC) processors or one or more complex-instruction-set-computing (CISC) processors. Communication apparatus 510 may include at least some of those components shown in FIG. 5 such as a processor 512, for example. Communication apparatus 510 may further include one or more other components not pertinent to the proposed scheme of the present disclosure (e.g., internal power supply, display device and/or user interface device), and, thus, such component(s) of communication apparatus 510 are neither shown in FIG. 5 nor described below in the interest of simplicity and brevity.

Network apparatus 520 may be a part of an electronic apparatus, which may be a network node such as a TRP, a base station, a small cell, a router or a gateway. For instance, network apparatus 520 may be implemented in an eNodeB in an LTE, LTE-Advanced or LTE-Advanced Pro network or in a gNB in a 5G, NR, IoT or NB-IoT network. Alternatively, network apparatus 520 may be implemented in the form of one or more IC chips such as, for example and without limitation, one or more single-core processors, one or more multi-core processors, one or more RISC processors, or one or more CISC processors. Network apparatus 520 may include at least some of those components shown in FIG. 5 such as a processor 522, for example. Network apparatus 520 may further include one or more other components not pertinent to the proposed scheme of the present disclosure (e.g., internal power supply, display device and/or user interface device), and, thus, such component(s) of network apparatus 520 are neither shown in FIG. 5 nor described below in the interest of simplicity and brevity.

In one aspect, each of processor 512 and processor 522 may be implemented in the form of one or more single-core processors, one or more multi-core processors, one or more RISC processors, or one or more CISC processors. That is, even though a singular term "a processor" is used herein to refer to processor 512 and processor 522, each of processor 512 and processor 522 may include multiple processors in some implementations and a single processor in other implementations in accordance with the present disclosure. In another aspect, each of processor 512 and processor 522 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 512 and processor 522 is a special-purpose machine specifically designed, arranged and configured to perform specific tasks including power consumption reduction in a device (e.g., as represented by communication apparatus 510) and a network (e.g., as represented by network apparatus 520) in accordance with various implementations of the present disclosure.

In some implementations, communication apparatus 510 may also include a transceiver 516 coupled to processor 512 and capable of wirelessly transmitting and receiving data. In some implementations, communication apparatus 510 may further include a memory 514 coupled to processor 512 and capable of being accessed by processor 512 and storing data therein. In some implementations, network apparatus 520 may also include a transceiver 526 coupled to processor 522 and capable of wirelessly transmitting and receiving data. In some implementations, network apparatus 520 may further include a memory 524 coupled to processor 522 and capable of being accessed by processor 522 and storing data therein. Accordingly, communication apparatus 510 and network apparatus 520 may wirelessly communicate with each other via transceiver 516 and transceiver 526, respectively. To aid better understanding, the following description of the operations, functionalities and capabilities of each of communication apparatus 510 and network apparatus 520 is provided in the context of a mobile communication environment in which communication apparatus 510 is implemented in or as a communication apparatus or a UE and network apparatus 520 is implemented in or as a network node of a communication network.

In some implementations, processor 512 may comprise a plurality of protocol layers including a PDCP layer, an RLC layer and a MAC layer. Processor 512 may be configured to establish, via transceiver 516, multiple links with network apparatus 520. For example, processor 512 may be configured to establish a first link with network apparatus 520. Processor 512 may also be configured to establish a second link with network apparatus 520.

In some implementations, processor 512 may be configured to generate and duplicate data packets (e.g., PDUs) with carrier aggregation. Processor 512 may be configured to generate a first PDU to transmit on the first link. Processor 512 may be configured to generate a second PDU to transmit on the second link. Processor 512 may generate the second PDU by duplicating the first PDU. Processor 512 may be configured to map the duplicated data packets to different carriers. Processor 512 may be configured to transmit, via transceiver 516, the first PDU on the first link, and transmit, via transceiver 516, the second PDU on the second link. Processor 512 may be further configured to determine whether to discard the duplicated data packet according to some conditions.

In some implementations, processor 512 may further comprise a first HARQ entity for the first link and a second HARQ entity for the second link. Network apparatus 520 may be configured to use the HARQ feedback to indicate whether the data packet is successfully received at network apparatus 520. After transmitting the first PDU on the first link, the first HARQ entity of processor 512 may be able to receive a HARQ feedback of the first PDU from network apparatus 520. Network apparatus 520 may use the HARQ feedback to indicate whether the first PDU transmitted over the first link is successfully received. In a case that a HARQ ACK is received, the HARQ entity may be configured to deliver the HARQ ACK to the upper layer. When the successful delivery of the PDU (e.g., PDCP data PDU) is confirmed, processor 512 may be triggered to discard the duplicated PDU.

In some implementations, when processor 512 is configured with PDCP duplication, processor 512 may be configured to activate the PDCP duplication for the SRB. For the UM DRB and the AM DRB, processor 512 may be configured to activate the PDCP duplication in a case that the activation of the PDCP duplication is indicated. Processor 512 may also be configured to deactivate the PDCP duplication in a case that the deactivation of the PDCP duplication is indicated.

In some implementations, when the deactivation of the PDCP duplication is indicated, processor 512 may be configured to discard all the duplicated data packet.

In some implementations, processor 512 may be configured with DC. Processor 512 may be configured to establish, via transceiver 516, a first link with the MCG. Processor 512 may also be configured to establish, via transceiver 516, a second link with the SCG. Processor 512 may comprise a first MAC entity for the first link and a second MAC entity for the second link. The data duplication operations and the discard mechanism in the DC scenario may be similar to the carrier aggregation scenario.

In some implementations, the feedback from network apparatus 520 may be received at the RLC layer of processor 512. Processor 512 may comprise a first RLC entity and a second RLC entity. After transmitting the first PDU on the first link, the first RLC entity may be able to receive an RLC feedback of the first PDU from network apparatus 520. Network apparatus 520 may use the RLC feedback to indicate whether the first PDU transmitted over the first link is successfully received. In a case that an ACK is received, processor 512 may configure the RLC layer to deliver the ACK to the upper layer (e.g., PDCP layer). When the successful delivery of the PDU (e.g., PDCP data PDU) is confirmed by one of the two associated RLC entities, processor 512 may be triggered to discard the duplicated PDU. For example, processor 512 may configure the other RLC entity to discard the duplicated data packet (e.g., PDCP PDU or RLC SDU).

In some implementations, processor 512 may be configured to transmit, via transceiver 516, a single copy or a reduced number of copies of the data to network apparatus 520 in the initial transmission. Processor 512 may be configured to transmit a first data packet (e.g., PDU or TB) on the first link. For resource efficiency, processor 512 may be configured to transmit another data packet which is different from the first data packet on the second link. The transmission on the second link may be independent from the transmission on the first link. In a case that the first data packet is not successfully acknowledged by network apparatus 520, processor 512 may be configured to perform re-transmission with an increased number of copies of the data packet on multiple links. Processor 512 may discard the data that is not acknowledged on the initial transmission. For example, processor 512 may determine that the first data packet is unacknowledged in a case that a NACK is received or no ACK is received. Processor 512 may be configured to re-transmit, via transceiver 516, the first data packet on the first link. Processor 512 may be further configured to generate a second data packet by duplicating the unacknowledged data (e.g., first data packet). Processor 512 may be configured to transmit, via transceiver 516, the second data packet on the second link when performing the re-transmission. In addition to the duplicated data from the first data packet, the second data packet may further comprise new data if possible.

In some implementations, processor 512 may be configured to initiate a timer (e.g., discard Timer) when the data arrives at the PDCP layer. Processor 512 may determine the duration of the timer based on the low-latency criterion of the data to be transmitted. Processor 512 may duplicate the data for transmission on the multiple links. Processor 512 may be configured to discard all copies of the data that are not yet transmitted when the timer is expired. Processor 512 may maintain the timer in the PDCP layer or in other layers. Processor 512 may also initiate the timer when the data arrives any other layers. The duration of the timer may be configured by network apparatus 520 or determined by communication apparatus 510 itself.

In some implementations, processor 512 may be configured to maintain a sliding window to discard the data. Processor 512 may maintain the sliding window in the PDCP layer or any other layers (e.g., RLC or MAC layer). Processor 512 may determine the length of the sliding window based on the expected rate of data arrival or the low-latency criterion of the data to be transmitted. The length of the sliding window may be configured by network apparatus 52 or determined by communication apparatus 510 itself. Processor 512 may configure the sliding window to advance as the data arrives at the layer in which the sliding window is maintained. For example, the sliding window may advance when a new PDU is generated. Processor 512 may be configured to discard the data (e.g., PDU) when the data falls out of the sliding window.

In some implementations, processor 512 may configure the sliding window to advance as the data (e.g., PDU) is transmitted on any of the multiple links. Processor 512 may maintain the sliding window in the lower layer (e.g., MAC layer). Processor 512 may be configured to discard the data when the data falls out of the sliding window.

In some implementations, after the data (e.g., first PDU) is transmitted on any link, processor 512 may be configured to discard all duplicated data that have not been transmitted (e.g., second PDU).

In some implementations, processor 512 may be configured to initiate a timer (e.g., discardTimer) for all the duplicated data (e.g., second PDU) after the data has been transmitted on a link (e.g., first PDU). Processor 512 may determine the duration of the timer based on the low-latency criterion of the data to be transmitted. Processor 512 may be configured to discard all the duplicated data that is not yet transmitted (e.g., second PDU) when the timer is expired. Processor 512 may maintain the timer in the RLC layer (e.g., RLC timer) or in other layers (e.g., PDCP or MAC timer). The duration of the timer may be configured by network apparatus 520 or determined by communication apparatus 510 itself.

Illustrative Processes

Figure 6:
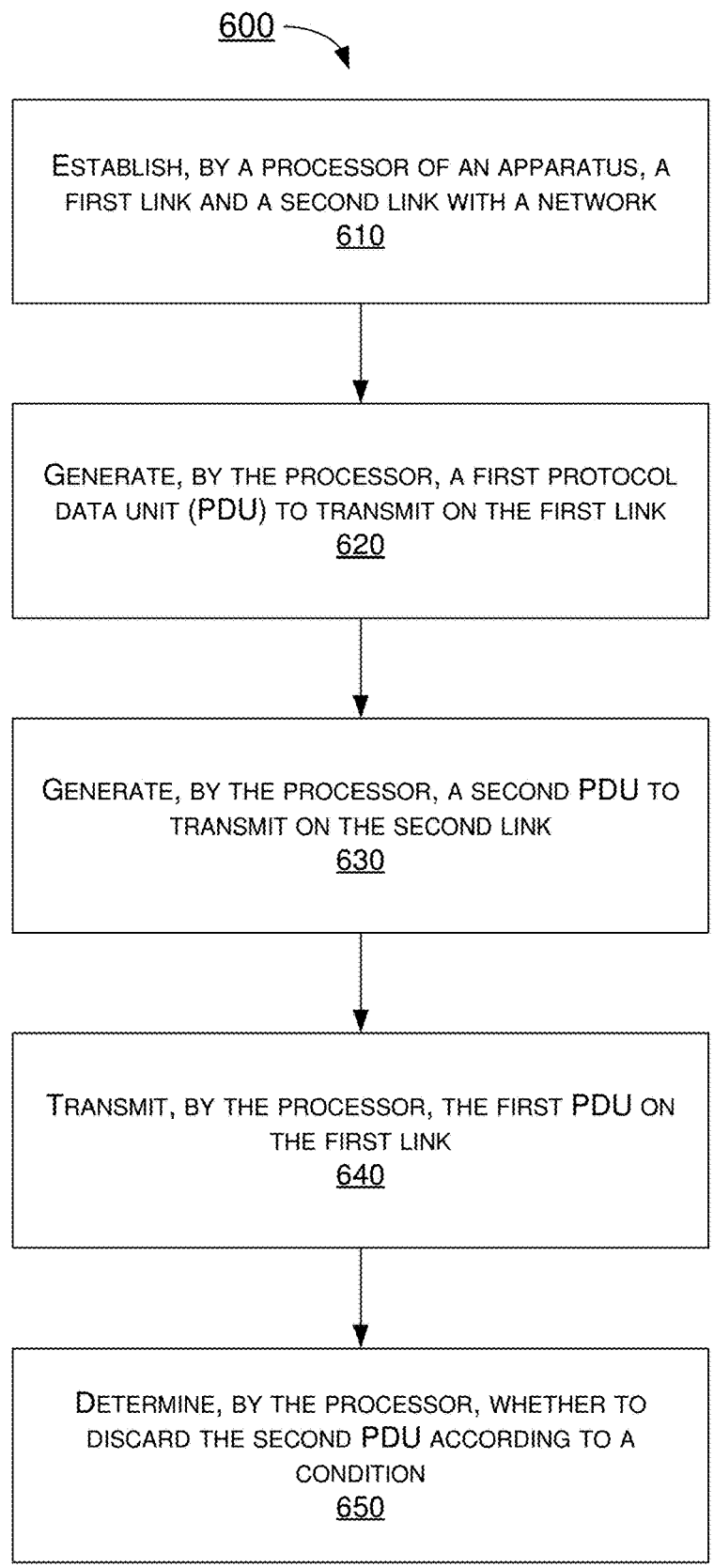
FIG. 6 is a flowchart of an example process in accordance with an implementation of the present disclosure.

FIG. 6 illustrates an example process 600 in accordance with an implementation of the present disclosure. Process 600 may be an example implementation of scenarios 100, 200, 300 and 400, whether partially or completely, with respect to data duplication handling in accordance with the present disclosure. Process 600 may represent an aspect of implementation of features of communication apparatus 510. Process 600 may include one or more operations, actions, or functions as illustrated by one or more of blocks 610, 620, 630, 640 and 650. Although illustrated as discrete blocks, various blocks of process 600 may be divided into additional blocks, combined into fewer blocks, or eliminated, depending on the desired implementation. Moreover, the blocks of process 600 may executed in the order shown in FIG. 6 or, alternatively, in a different order. Process 600 may be implemented by communication apparatus 510 or any suitable UE or machine type devices. Solely for illustrative purposes and without limitation, process 600 is described below in the context of communication apparatus 510. Process 600 may begin at block 610.

At 610, process 600 may involve processor 512 of apparatus 510 establishing a first link and a second link with a network. Process 600 may proceed from 610 to 620.

At 620, process 600 may involve processor 512 generating a first PDU to transmit on the first link. Process 600 may proceed from 620 to 630.

At 630, process 600 may involve processor 512 generating a second PDU to transmit on the second link. Process 600 may proceed from 630 to 640.

At 640, process 600 may involve processor 512 transmitting the first PDU on the first link. Process 600 may proceed from 640 to 650.

At 650, process 600 may involve processor 512 determining whether to discard the second PDU according to a condition. The second PDU may be duplicated from the first PDU.

In some implementations, process 600 may involve processor 512 initiating a timer. Process 600 may also involve processor 512 discarding the second PDU when the timer is expired. The second PDU may not be transmitted before expiration of the timer.

In some implementations, process 600 may involve processor 512 maintaining a sliding window. Process 600 may also involve processor 512 discarding a PDU when the PDU falls out of the sliding window. The sliding window may advance when a new PDU is generated.

In some implementations, process 600 may involve processor 512 maintaining a sliding window. Process 600 may also involve processor 512 discarding a PDU when the PDU falls out of the sliding window. The sliding window may advance when a PDU is transmitted.

In some implementations, process 600 may involve processor 512 discarding the second PDU after the first PDU is transmitted.

In some implementations, process 600 may involve processor 512 initiating a timer after the first PDU is transmitted. Process 600 may also involve processor 512 discarding the second PDU when the timer is expired.

In some implementations, process 600 may involve processor 512 receiving an acknowledgement of the first PDU. Process 600 may also involve processor 512 discarding the second PDU after receiving the acknowledgement. The acknowledgement may be received at an RLC layer. Alternatively, the acknowledgement may be received via a HARQ feedback.

In some implementations, a process may involve processor 512 establishing a first link and a second link with a network. The process may also involve processor 512 generating a first PDU to transmit on the first link. The process may further involve processor 512 transmitting the first PDU on the first link. The process may further involve processor 512 determining that the first PDU is unacknowledged. The process may further involve processor 512 re-transmitting the first PDU on the first link. The process may further involve processor 512 generating a second PDU by duplicating the first PDU. The process may further involve processor 512 transmitting the second PDU on the second link.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to,"

the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
   establishing, by a processor of an apparatus, a first link and a second link with a network;
   generating, by the processor, a first protocol data unit (PDU) to transmit on the first link;
   generating, by the processor, a second PDU to transmit on the second link;
   transmitting, by the processor, the first PDU on the first link; and
   determining, by the processor, whether to discard the second PDU according to a condition,
   wherein the second PDU is duplicated from the first PDU, and
   wherein, in an event that a sliding window is utilized in determining whether to discard the second PDU, the determining comprises:
      determining a length of the sliding window based on an expected rate of data arrival or a low-latency criterion of data transmission;
      advancing the sliding window as a result of PDU transmission or generation; and
      determining to discard the second PDU responsive to the second PDU falling out of the sliding window as the sliding window is advanced.

2. The method of claim 1, further comprising:
   initiating, by the processor, a timer; and
   discarding, by the processor, the second PDU when the timer is expired,
   wherein the second PDU is not transmitted before expiration of the timer.

3. The method of claim 1, further comprising:
   discarding, by the processor, the second PDU when the second PDU falls out of the sliding window,
   wherein the sliding window advances when a new PDU is generated.

4. The method of claim 1, further comprising:
   discarding, by the processor, the second PDU when the second PDU falls out of the sliding window,
   wherein the sliding window advances when the first PDU is transmitted.

5. The method of claim 1, further comprising:
   discarding, by the processor, the second PDU after the first PDU is transmitted.

6. The method of claim 1, further comprising:
   initiating, by the processor, a timer after the first PDU is transmitted; and
   discarding, by the processor, the second PDU when the timer is expired.

7. The method of claim 1, further comprising:
   receiving, by the processor, an acknowledgement of the first PDU; and
   discarding, by the processor, the second PDU after receiving the acknowledgement.

8. The method of claim 7, wherein the acknowledgement is received at a radio link control (RLC) layer.

9. The method of claim 7, wherein the acknowledgement is received via a hybrid automatic repeat request (HARQ) feedback.

10. A method, comprising:
    establishing, by a processor of an apparatus, a first link and a second link with a network;
    generating, by the processor, a first protocol data unit (PDU) to transmit on the first link;
    transmitting, by the processor, the first PDU on the first link;
    determining, by the processor, that the first PDU is unacknowledged;
    re-transmitting, by the processor, the first PDU on the first link;
    generating, by the processor, a second PDU which comprises duplicated data from the first PDU along with new data; and
    transmitting, by the processor, the second PDU on the second link.

11. An apparatus, comprising:
    a transceiver configured to wirelessly communicate with a plurality of nodes of a wireless network; and a processor communicatively coupled to the transceiver, the processor configured to perform operations comprising:
    establishing, via the transceiver, a first link and a second link with a network;
    generating a first protocol data unit (PDU) to transmit on the first link;
    generating a second PDU to transmit on the second link;
    transmitting, via the transceiver, the first PDU on the first link; and
    determining whether to discard the second PDU according to a condition,
wherein the second PDU is duplicated from the first PDU, and
wherein, in an event that a sliding window is utilized in determining whether to discard the second PDU, the determining comprises:
    determining a length of the sliding window based on an expected rate of data arrival or a low-latency criterion of data transmission;
    advancing the sliding window as a result of PDU transmission or generation; and
    determining to discard the second PDU responsive to the second PDU falling out of the sliding window as the sliding window is advanced.

12. The apparatus of claim 11, wherein the processor is further capable of:
    initiating a timer; and
    discarding the second PDU when the timer is expired,
    wherein the second PDU is not transmitted before expiration of the timer.

13. The apparatus of claim 11, wherein the processor is further capable of:
    discarding the second PDU when the second PDU falls out of the sliding window,
    wherein the sliding window advances when a new PDU is generated.

14. The apparatus of claim 11, wherein the processor is further capable of:
    discarding the second PDU when the second PDU falls out of the sliding window,
    wherein the sliding window advances when a PDU is transmitted.

15. The apparatus of claim 11, wherein the processor is further capable of:
    discarding the second PDU after the first PDU is transmitted.

16. The apparatus of claim 11, wherein the processor is further capable of:
    initiating a timer after the first PDU is transmitted; and
    discarding the second PDU when the timer is expired.

17. The apparatus of claim 11, wherein the processor is further capable of:
    receiving, via the transceiver, an acknowledgement of the first PDU; and
    discarding the second PDU after receiving the acknowledgement.

18. The apparatus of claim 17, wherein the acknowledgement is received at a radio link control (RLC) layer.

19. The apparatus of claim 17, wherein the acknowledgement is received via a hybrid automatic repeat request (HARQ) feedback.

\* \* \* \* \*